US010222744B2

(12) United States Patent
Junod

(10) Patent No.: US 10,222,744 B2
(45) Date of Patent: Mar. 5, 2019

(54) MECHANISM FOR REGULATING THE TORQUE RATIO BETWEEN TIME-PIECE WHEEL SETS

(71) Applicant: Montres Breguet S.A., L'Abbaye (CH)

(72) Inventor: Benoit Junod, Peillonex (FR)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 15/362,244

(22) Filed: Nov. 28, 2016

(65) Prior Publication Data
US 2017/0176936 A1    Jun. 22, 2017

(30) Foreign Application Priority Data
Dec. 18, 2015  (EP) .................................... 15201242

(51) Int. Cl.
G04B 1/22    (2006.01)
G04B 13/00   (2006.01)
G04B 17/26   (2006.01)
F16H 1/28    (2006.01)
F16H 57/08   (2006.01)

(52) U.S. Cl.
CPC .............. G04B 1/22 (2013.01); G04B 13/001 (2013.01); G04B 13/008 (2013.01); G04B 17/26 (2013.01); *F16H 1/28* (2013.01); *F16H 57/082* (2013.01)

(58) Field of Classification Search
CPC ........ G04B 1/22; G04B 1/225; G04B 13/001; G04B 13/008; G04B 17/26
See application file for complete search history.

(56) References Cited

U.S. PATENT DOCUMENTS

| 2,783,657 | A | * | 3/1957 | Kohlhagen | ............... | F16H 1/16 185/40 B |
| 3,008,348 | A | * | 11/1961 | Schroeder | .............. | G04B 35/00 235/61 A |
| 9,052,693 | B2 | | 6/2015 | Kawauchiya et al. | | |
| 2007/0079657 | A1 | * | 4/2007 | Moteki | .................. | G04B 17/30 73/535 |

(Continued)

FOREIGN PATENT DOCUMENTS

CH     707 743 A2    9/2014
CH     708 526 A2    3/2015

(Continued)

OTHER PUBLICATIONS

European Search Report dated Jun. 22, 2016 in European Application 15201242.3, filed on Dec. 18, 2015 (with English Translation of Categories of cited documents & Written Opinion).

Primary Examiner — Daniel Wicklund
(74) Attorney, Agent, or Firm — Oblon, McClelland, Maier & Neustadt, L.L.P.

(57) ABSTRACT

A timepiece torque variator mechanism regulates the torque ratio between a first path extending about a first pivot axis and a second path about a second pivot axis. The mechanism includes a planetary element that simultaneously cooperates in a first contact area with a first path and in a second contact area with a second path. The mechanism also includes a control device arranged to adjust the radial position of the first contact area with respect to the first pivot axis and/or to adjust the radial position of the second contact area with respect to the second pivot axis.

17 Claims, 3 Drawing Sheets

(56) References Cited

U.S. PATENT DOCUMENTS

| | | | | |
|---|---|---|---|---|
| 2010/0254229 A1* | 10/2010 | Kury | ................ | G04B 1/12 |
| | | | | 368/208 |
| 2010/0315908 A1* | 12/2010 | Tran | ................ | G04B 9/00 |
| | | | | 368/142 |
| 2014/0056113 A1* | 2/2014 | Cornibe | ............ | G04B 1/16 |
| | | | | 368/142 |
| 2016/0274540 A1* | 9/2016 | Streubel | ............ | G04B 1/10 |
| 2017/0261933 A1* | 9/2017 | Favre | ................ | G04B 15/14 |

FOREIGN PATENT DOCUMENTS

| EP | 2 288 967 B1 | 11/2011 |
|---|---|---|
| EP | 2 701 013 A1 | 2/2014 |
| WO | WO 2009/152972 A1 | 12/2009 |
| WO | WO 2012/168443 A2 | 12/2012 |

\* cited by examiner

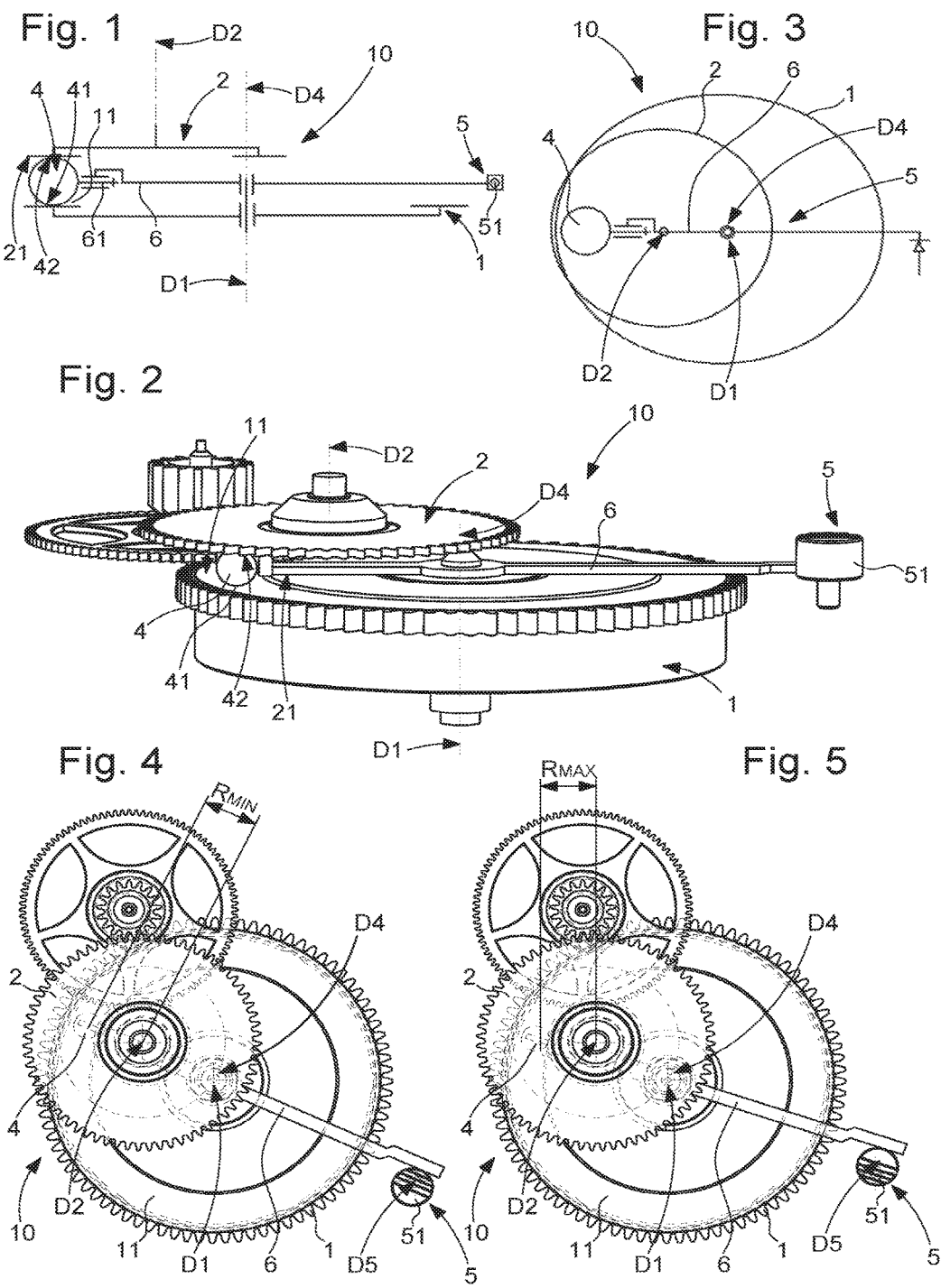

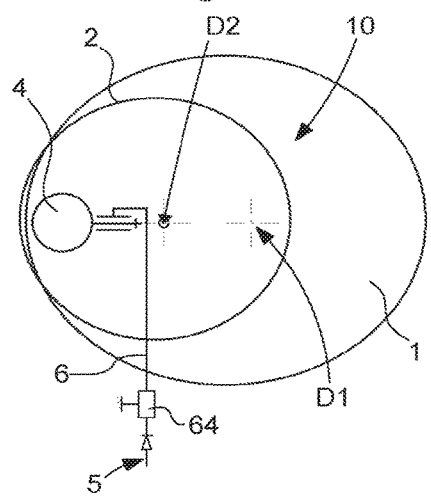
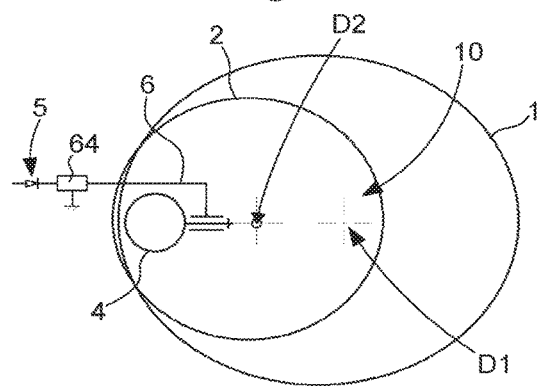
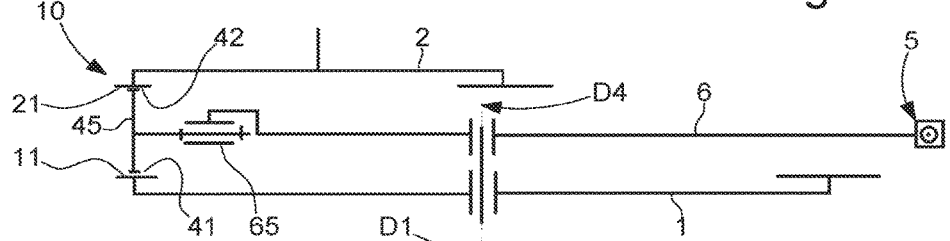
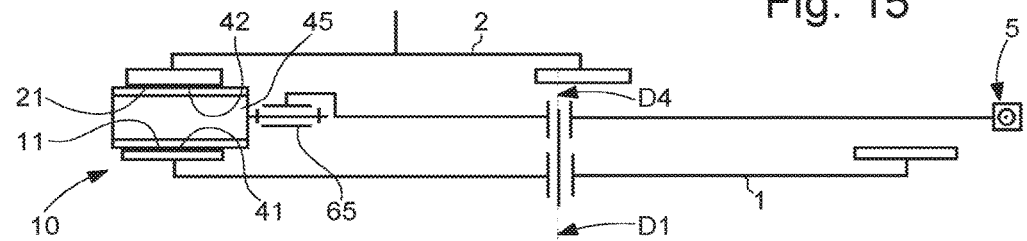
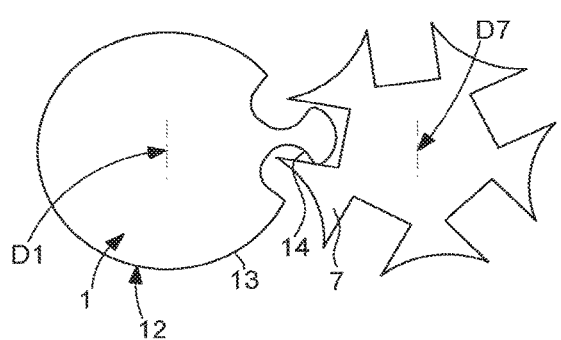
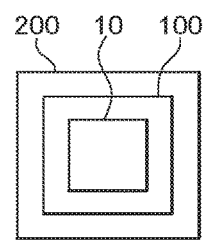

MECHANISM FOR REGULATING THE TORQUE RATIO BETWEEN TIME-PIECE WHEEL SETS

This application claims priority from European Patent Application No 15201242.3 of Dec. 18, 2015, the entire disclosure of which is hereby incorporated herein by reference.

FIELD OF THE INVENTION

The invention concerns a torque variator mechanism for regulating the torque ratio between a first path extending about a first pivot axis, and a second path extending about a second pivot axis, said first path being arranged to be added to or incorporated in a first timepiece wheel set pivoting about said first pivot axis, and said second path being arranged to be added to or incorporated in a second timepiece wheel set pivoting about said second pivot axis.

The invention also concerns a timepiece movement including at least one such torque variator mechanism.

The invention also concerns a watch including at least one such movement, and/or at least one such torque variator mechanism.

The invention concerns the field of timepiece mechanisms, and more particularly regulation of drive mechanisms, and adaptation of the torque ratio between two wheel sets.

BACKGROUND OF THE INVENTION

In a timepiece mechanism, it is difficult to correctly modulate the torque ratio between two wheel sets.

This problem particularly concerns adaptation of the level of torque delivered by a barrel to an escapement mechanism by means of a going train: the value of this torque defines the oscillator amplitude, and therefore greatly affects its chronometric performance.

Likewise, the torque ratio between an oscillating weight and a barrel is one of the parameters that characterises the winding speed of a detent type escapement movement.

Generally speaking, the sizing of timepiece systems is a compromise between a high torque value when the barrel is at the maximum winding, and a low torque value when the barrel is almost let down.

There are known mechanisms allowing a constant torque to be transmitted to the going train, such as, for example, the fusee device wherein the lever arm between the chain and fusee is variable according to the state of winding of the barrel. However, such mechanisms are not devised for modification of the torque ratio via an adjustment operation.

SUMMARY OF THE INVENTION

The present invention proposes to allow a torque ratio between two wheel sets to be immediately modified by a simple adjustment operation.

To this end, the invention concerns a torque variator mechanism according to claim 1.

In short, in a particular, nonlimiting application illustrated by the Figures, the invention presents a first wheel set, a second wheel set, not concentric to the first, and a planetary wheel whose axis of rotation is orthogonal to the planes of the two wheel sets, and whose perimeter rolls without slipping on the planes of the two wheel sets. The position of this planetary wheel is given by a planetary wheel carrier, which is itself connected to the frame of the movement, main plate or bridges, through a connection which may be a fixed connection, a pivot connection, or a sliding connection, and which allows the relative position of the planetary wheel to change with respect to the two wheel sets, and thus their gear ratio.

The invention can thus be used for different applications, such as achieving a constant force without levelling torque downwards, or to adjust the mean amplitude of an oscillator, the winding ratio of an automatic device, the torque value transmitted to a complication regulator, to a striking mechanism, or other element.

Modification of the transmission ratio changes the torque and the rotational speed, and the mechanism according to the invention can also regulate the speed of wheel sets, for example for display applications.

The invention also concerns a timepiece movement including at least one such torque variator mechanism.

The invention also concerns a watch including at least one such movement, and/or at least one such torque variator mechanism.

BRIEF DESCRIPTION OF THE DRAWINGS

Other features and advantages of the invention will appear upon reading the following detailed description, with reference to the annexed drawings, in which:

FIG. 1 is a kinematic diagram illustrating a first embodiment of the invention, with a planetary wheel carrier with a ball between two paths carried by two wheel sets, this planetary wheel carrier being in a pivot connection about the axis of the first wheel set.

FIG. 2 is a schematic perspective view of a mechanism according to this first embodiment.

FIG. 3 is a kinematic diagram, in a top view, of same first embodiment.

FIG. 4 is a top view of the mechanism of FIG. 2, in an adjustment position corresponding to a minimum radius between a ball, forming the planetary wheel, and the axis of the second wheel set.

FIG. 5 is a similar view to FIG. 4, in another adjustment position corresponding to a maximum radius between the ball and the axis of the second wheel set

FIGS. 12 and 13 are kinematic diagrams, in a top view, illustrating a third embodiment of the invention, with the planetary wheel carrier controlled linearly, perpendicularly in FIG. 12, or in parallel in FIG. 13, to the plane formed by the axes of rotation of the two wheel sets.

FIGS. 14 and 15 are kinematic diagrams illustrating a fourth embodiment of the invention, wherein the planetary wheel is toothed and cooperates with toothings or paths notched with concentric grooves on the two wheel sets.

FIG. 16 is a detailed view of a wheel set forming a differential input in conjunction with the first wheel set, and able to occupy discrete positions.

FIG. 17 is a block diagram representing a watch including a timepiece movement which in turn includes a mechanism according to the invention.

DETAILED DESCRIPTION OF PREFERRED EMBODIMENTS

Figure 6:
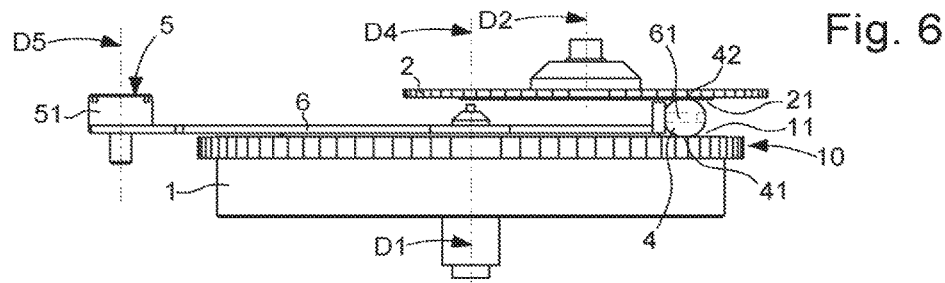
FIG. 6 is a side view of the mechanism of FIG. 2, showing the ball pivoted on an arbor comprised in the planetary wheel carrier.
Figure 7:
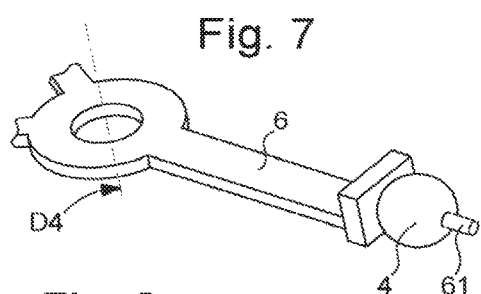
FIG. 7 is a partial schematic perspective view of this ball pivoted on an arbor of the planetary wheel carrier.
Figure 8:
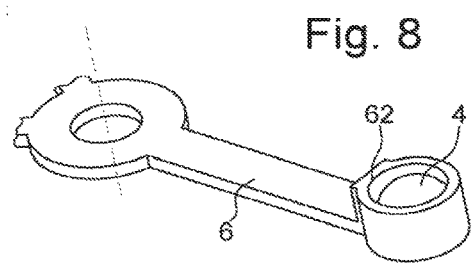
FIG. 8 is a similar view to FIG. 7 of a variant wherein the ball is enclosed laterally inside a chamber comprised in the planetary wheel carrier.

The invention concerns a torque variator mechanism 10 for regulating the torque ratio between a first path 11 extending about a first pivot axis D1, and a second path 21 extending about a second pivot axis D2.

More particularly, first path 11 extends in a first plane P1 perpendicular to a first pivot axis D1, and second path 21 extends in a second plane P2 perpendicular to a second pivot axis D2. This means that first path 11, and/or second path 21, may consist of a toothing, or similar, extending in a regular manner on either side of a first plane P1 or second plane P2.

In a particular case, first path 11 and the second path 21 are planar.

First path 11 is arranged to be added to or incorporated in a first timepiece wheel set 1 pivoting about a first pivot axis D1. Second path 21 is arranged to be added to or incorporated in a second timepiece wheel set 2 pivoting about second pivot axis D2.

The invention is illustrated with a non-limiting integrated variant, wherein a first wheel set 1 comprises first path 11, and wherein a second timepiece wheel set 2 comprises second path 21.

However, the invention is also applicable to other variants, notably with annular, or toric, or conical, or similar paths, arranged to be added to existing wheel sets, such as wheels, drums, or suchlike.

According to the invention, torque variator mechanism 10 comprises at least one planetary element 4, forming a planetary wheel, simultaneously cooperating in a drive relation in a first contact area 41 with first path 11, and in a second contact area 42 with second path 21. Mechanism 10 also comprises control means 5, which are arranged to adjust the radial position of first contact area 41 with respect to first pivot axis D1, and/or to adjust the radial position of second contact area 42 with respect to second pivot axis D2, so as to modify the torque ratio between first wheel set 1 and second wheel set 2.

In a particular variant, control means 5 are arranged both to adjust the radial position of first contact area 41 with respect to first pivot axis D1, and to adjust the radial position of second contact area 42 with respect to second pivot axis D2.

In a particular embodiment illustrated by the Figures, first pivot axis D1 is parallel to second pivot axis D2.

In a particular embodiment, particularly in a variant illustrated in FIGS. 12 and 13, control means 5 are arranged to modify the curvilinear position of a planetary wheel carrier 6 carrying planetary element 4, along a curve extending in the bisector plane. It is understood that this modification of the curvilinear position may concern both the radial position and the angular position.

More particularly, control means 5 are arranged to modify the linear position of planetary wheel carrier 6 along a straight line extending into the bisector plane. For example, an arbor of planetary wheel carrier 6 slides linearly into a guide sleeve 64, as seen in FIGS. 12 and 13.

In a variant illustrated in FIGS. 1 to 11 and 14 and 15, control means 5 are arranged to modify the angular position of a planetary wheel carrier 6 carrying planetary element 4, with respect to an intermediate axis D4, in a bisector plane of first plane P1 and of second plane P2.

More particularly, intermediate axis D4 is parallel to first pivot axis D1 and to second pivot axis D2 when the latter are parallel.

More particularly still, intermediate axis D4 is coincident with first pivot axis D1 or second pivot axis D2.

Figure 9:
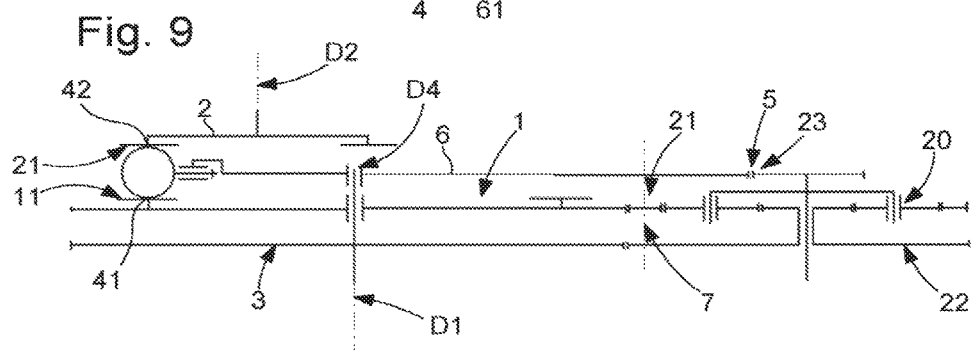
FIG. 9 is a kinematic diagram illustrating a second embodiment of the invention, with the planetary wheel carrier controlled by the output of a differential, one input of which is associated with the rotation of the first wheel set, and the other input of which is associated with the rotation of a third wheel set, capable of connection to an elastic return means arranged for driving the first wheel set.
Figures 10, 11:
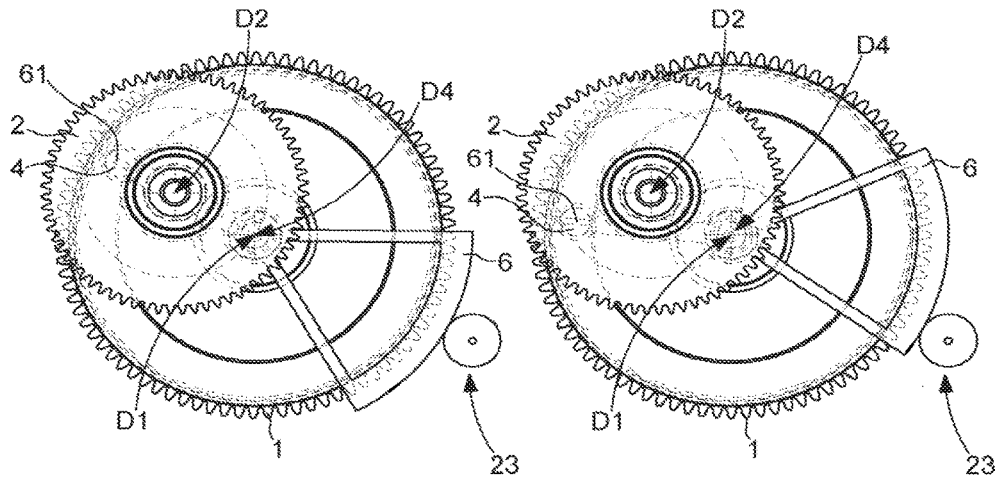
FIG. 10 is a top view of a mechanism according to this second embodiment with a differential, wherein the planetary wheel carrier comprises a toothed sector cooperating with an output pinion of the differential, in an extreme position corresponding to a minimum radius between the ball and the axis of the second wheel set.
FIG. 11 is a similar view to FIG. 10, in another adjustment position corresponding to a maximum radius between the ball and the axis of the second wheel set

In the particular variant of FIGS. 9 to 11, control means 5 are driven by the output 23 of a differential 20, a first input 21 of which is arranged to be driven by first wheel set 1, and a second input 22 of which is driven by a third wheel set 3 capable of connection to an elastic return means arranged for driving first wheel set 1, such as a barrel ratchet.

In a particular embodiment of this variant with a differential, first input 21 is only temporarily driven by first wheel set 1 and occupies discrete positions.

In particular, as seen in FIG. 16, first wheel set 1 comprises, on a peripheral surface 12, alternating regular contours 13 all of the same radius, and relief portions 14 of different radius or module and first input 21 is arranged to be driven in jumps by first wheel set 1, and comprises a wheel set 7, which is arranged to slide over regular contours 13 and to pivot on encountering relief portions 14. This wheel set 7 occupies discrete angular positions, in which wheel set 7 is held by its cooperation with peripheral surface 12.

More particularly, wheel set 7 is a Maltese cross wheel set, of the type employed in perpetual calendar mechanisms for determining the length of leap year months.

In an advantageous application of the invention, first wheel set 1 is a barrel drum, and the third wheel set is a winding ratchet connected to a mainspring arranged for driving the barrel drum.

More particularly, and as seen in the variants of FIGS. 2 to 6, control means 5 comprise an eccentric adjustment screw 51, accessible to a watchmaker for an initial or after sales adjustment.

Different technologies can be used to implement the invention.

In particular, in the embodiments of FIGS. 1 to 13, first path 11 and second path 21 are planar, and mechanism 10 comprises a planetary wheel carrier 6 controlled in position by control means 5 and carrying planetary element 4 which is a ball. This ball is either, as in FIG. 7, pivoted about a first arbor 61 comprised in planetary wheel carrier 6 and which passes diametrically through the ball, or, as in FIG. 8, free with minimum play in a substantially cylindrical chamber 62 comprised in planetary wheel carrier 6, and with which it is flush at both ends, to cooperate with first path 11 on a first side, and with second path 21 on a second side. Other embodiments are of course possible, with other forms of planetary element 4 and other forms of guidance.

In another embodiment seen in FIGS. 14 and 15, first path 11 and second path 21 are toothed, and mechanism 10 comprises a planetary wheel carrier 6 controlled in position by control means 5 and carrying planetary element 4, which is a toothed pinion 45, which is pivoted about a second arbor, or in a sleeve 65 comprised in planetary wheel carrier 6. Of course, first wheel set 1 and second wheel set 2 must then be notched with grooves, or concentric with the axes of rotation of the wheel sets, or deliberately oriented in one direction to promote the mesh with planetary wheel 4 throughout its operating range.

A few particular embodiments are described below, they are non-limiting, and may be combined with each other.

A first embodiment, in FIGS. 1 to 6, is a simple variator with a ball rolling without slipping, and with a fixed ratio determined in a setting operation, by a simple mechanical setting device, accessible to the watchmaker during the assembling of the movement, and also easily accessible to the after sales technician, forming control means 5, consisting here of an eccentric screw. The angular position of planetary wheel carrier 6 can thus be modified immediately by means of a cam or a screw accessible from the exterior of the watch head for example.

This first embodiment is illustrated in FIGS. 2 to 6 with first wheel set 1 formed by a barrel drum, in which torque is not constant according to the angular position of the drum, and second wheel set 2 is formed by a going train wheel set, or by a wheel set of the automatic device. In both cases, the user, or rather the watchmaker, can adjust, by means of a manual adjustment means or a mechanism, the transmission ratio and therefore the mean torque applied to the second wheel set, which makes it possible to adjust the amplitude, or respectively the properties of the automatic winding mechanism.

FIG. 4 illustrates an adjustment position corresponding to a minimum radius Rmin between ball 4, forming the planetary wheel, and second axis D2 of second wheel set 2, which corresponds to a maximum reduction ratio, particularly to maximum winding of the barrel. FIG. 5 illustrates another adjustment position corresponding to a maximum radius RMAX between ball 4 and second axis D2, which corresponds to a minimum reduction ratio, when the barrel is let down. In this embodiment, ball 4 is mounted to pivot on an arbor 61 carried by planetary wheel carrier 6.

A second embodiment 2 is illustrated in FIGS. 9 to 11, in the form of a variator with a ball 4 that rolls without slipping, and a variable ratio controlled by a differential 20. FIGS. 10 and 11 show the mesh between planetary wheel carrier 6 and differential output 23.

In this second embodiment, the position of planetary wheel carrier 6, which is also represented here with a pivot axis D4 coincident with first pivot axis D1 of first wheel set 1, is directly controlled by a differential 20 whose output 23, connected to planetary wheel carrier 6, depends on the state of winding of a barrel whose drum forms first wheel set 1. FIG. 9 illustrates the kinematic principle of this second embodiment and FIGS. 10 and 11 a non-limiting example of construction.

Thus, first output 21 of differential 20 is associated with the rotation of the barrel drum, whereas the second input 22 of differential 20 is directly connected to a barrel ratchet 3, by means of which the barrel is wound, manually or automatically with an oscillating weight mechanism. The use of such a differential 20 is known for displaying the power reserve of a movement, or to achieve certain displays on an oscillating weight, Differential 20 is also useful, in this second embodiment, for varying the transmission ratio between the barrel and a second wheel set 2, going train or automatic winding train, for example, for transmitting thereto a constant torque regardless of the state of winding of the barrel.

This solution requires temporarily connecting first differential input 21 to barrel drum 1, since, if these two wheel sets were simply connected by a gear, the barrel would then be instantaneously let down on rotating planetary wheel carrier 6 in its end position.

To avoid this configuration, and to alternately modify the position of planetary wheel carrier 6 without affecting the unwinding of the barrel the rest of the time, a wheel set 7 is used, as described above, FIG. 16 illustrates the principle of a Maltese cross type system, although the latter generates significant mechanical friction between first input 21 of differential 20 and drum 1. Preferably, a rolling wheel set 7 is implemented, using less energy, to minimise mechanical friction between the barrel drum 1 (driving wheel) and the first differential input (wheel) the latter is at rest. In particular, the first differential input is driven once per revolution of barrel drum 1, which, upon each passage, modifies the position of planetary wheel 6, and thus modifies the torque ratio between barrel drum 1 and second wheel set 2, which is the first wheel set of the going train here.

FIGS. 12 and 13 illustrate a third embodiment, with a variator comprising a ball that rolls without slipping, guided by a planetary wheel carrier 6 in translation. In this third embodiment, planetary wheel carrier 6 is in translation with respect to the basic movement (sliding connection) rather than in rotation (pivot connection). FIGS. 12 and 13 illustrate the kinematic principle of this third embodiment. The translation of planetary wheel carrier 4 may be achieved along several axes, depending on the size of the movement and the effectiveness (efficiency) of the transmission. For example, this translation may be achieved in parallel to the plane passing through the axes of rotation D1 and D2 of the two wheel sets 1 and 2. The position in translation of planetary wheel carrier 6 can be modified by an adjustment device, such as a cam or a screw accessible from the exterior of the watch head, as illustrated in the other variants.

The invention also concerns a timepiece movement 100 comprising at least one such torque variator mechanism 10 whose first path 11 and second path 21 are respectively integral with a first wheel set 1 and a second wheel set 2 comprised in movement 100.

The invention also concerns a watch 200 including at least one such movement, and/or at least one such torque variator mechanism 10.

The invention makes it possible to adapt the reduction ratio between two wheel sets for several types of applications, several non-limiting examples of which are cited below.

A first application concerns amplitude adjustment: by modifying the torque ratio upstream of a display train (hand), the proposed systems allow the watchmaker to adjust its amplitude, and also the power reserve since the two parameters are connected, to adapt it to the performance of its movement. This adjustment is achieved via a cam or an adjustment screw, a lever or suchlike, preferably accessible from the exterior of the watch.

A second application concerns adjustment of the winding speed: by modifying the ratio between the oscillating weight and the barrel ratchet, the proposed systems can act on one of the parameters that define the winding speed of the movement.

A third application concerns obtaining a constant force: by using a differential mechanism connected (by a wheel or Maltese cross system) to the barrel drum and to the ratchet, the torque variator can adapt the reduction ratio of the going train (upstream of the display mechanisms) to the state of winding of the barrel. The output torque of the second wheel set is constant overall, which allows the oscillator to enjoy a constant supply of energy over the entire power reserve of the movement. Unlike other constant force systems, the invention has the advantage of not dissipating the surplus energy available to the barrel, unlike the downward levelling known from the prior art.

A fourth application concerns the adjustment of the speed of a train of a striking or complication mechanism. Indeed, in numerous timepiece complications, the rate of mechanisms is set by a regulator via a regulating train. The gear ratio of this regulating train defines the speed of the regulator and the braking torque of the mechanism. By adapting the reduction ratio of such a gear train, the present invention makes it possible to adjust the speed of the complication mechanism: the duration of the chime, length of animation of the mechanism, or similar.

In the case where first wheel set 1 and second wheel set 2 pivot about axes that are not parallel in space, or coplanar but intersecting, the invention provides, especially in the variant with a ball, a good energy transmission means, provided that the conditions for rolling are ensured.

Generally speaking, to facilitate rolling, a friction coating can be applied to first path 11, second path 21, or planetary element 4.

The invention is easily applicable to:
any basic movement;
timepiece movements with tight chronometrical specifications;
complication mechanisms and regulators.

What is claimed is:

1. A torque variator mechanism for regulating the torque ratio between a first path extending about a first pivot axis, and a second path extending about a second pivot axis, said first path being arranged in a first timepiece wheel set pivoting about said first pivot axis, and said second path being arranged in a second timepiece wheel set pivoting about said second pivot axis, said torque variator mechanism comprising:
at least one planetary element simultaneously cooperating in a driving relation in a first contact area with said first path and in a second contact area with said second path; and
control means arranged to adjust the radial position of said first contact area with respect to said first pivot axis, and/or to adjust the radial position of said second contact area with respect to said second pivot axis, so as to modify the torque ratio between said first wheel set and said second wheel set.

2. The torque variator mechanism according to claim 1, wherein said control means is arranged both to adjust the radial position of said first contact area with respect to said first pivot axis and to adjust the radial position of said second contact area with respect to said second pivot axis.

3. The torque variator mechanism according to claim 1, wherein said first pivot axis is parallel to said second pivot axis.

4. The torque variator mechanism according to claim 3, wherein said intermediate pivot axis is parallel to said first pivot axis and to said second pivot axis.

5. The torque variator mechanism according to claim 1, wherein said control means is arranged to modify the curvilinear position of a planetary wheel carrier carrying said planetary element, along a curve extending in the bisector plane.

6. The torque variator mechanism according to claim 5, wherein said control means is arranged to modify the curvilinear position of said planetary wheel carrier along a straight line extending in the bisector plane.

7. The torque variator mechanism according to claim 5, wherein said control means is arranged to modify the angular position of a planetary wheel carrier carrying said planetary element, with respect to an intermediate axis, in a bisector plane of said first plane and of said second plane.

8. The torque variator mechanism according to claim 1, wherein said control means is driven by an output of a differential, a first input of which is arranged to be driven by said first wheel set, and a second input of which is driven by a third wheel set connected to an elastic return means arranged for driving said first wheel set.

9. The torque variator mechanism according to claim 8, wherein said first input is only temporarily driven by said first wheel set and occupies discrete positions.

10. The torque variator mechanism according to claim 9, wherein said first wheel set comprises, on a peripheral surface, alternating regular contours all of the same radius, and relief portions of different radius or module, and wherein said first input is arranged to be driven in jumps by said first wheel set, and comprises a fourth wheel set which is arranged to slide over said regular contours and to pivot on encountering said relief portions, and which occupies discrete angular positions in which said wheel set is held by the cooperation thereof with said peripheral surface.

11. The torque variator mechanism according to claim 10, wherein said fourth wheel set is a Maltese cross shaped wheel set.

12. The torque variator mechanism according to claim 8, wherein said first path is associated with said first wheel set which is a barrel drum, and wherein said third wheel set is a winding ratchet connected to a mainspring arranged for driving said barrel drum.

13. The torque variator mechanism according to claim 1, wherein said control means comprises an eccentric adjustment screw, accessible to a watchmaker for an initial or after sales adjustment.

14. The torque variator mechanism according to claim 1, wherein said first path and said second path are planar, and wherein said torque variator mechanism comprises a planetary wheel carrier, which is controlled in position by said control means, and carries said planetary element which is a ball, wherein said ball is either pivoted about a first arbor comprised in said planetary wheel carrier and which passes diametrically through said ball, or is free inside a chamber comprised in said planetary wheel carrier.

15. The torque variator mechanism according to claim 1, wherein said first path and said second path are toothed, and wherein said torque variator mechanism comprises a planetary wheel carrier, which is controlled in position by said control means, and carries said planetary element which is a toothed pinion which is pivoted about a second arbor or in a sleeve comprised in said planetary wheel carrier.

16. A timepiece movement comprising at least one torque variator mechanism according to claim 1, wherein said first path and said second path are respectively integral with said first timepiece wheel set and said second timepiece wheel set comprised in said movement.

17. A watch comprising at least one torque variator mechanism according to claim 1.

* * * * *